United States Patent [19]

Yamashita et al.

[11] Patent Number: 4,595,253
[45] Date of Patent: Jun. 17, 1986

[54] PARALLEL-TO-SERIAL CONVERSION OF OPTICAL DATA USING ACOUSTO-OPTICAL DIFFRACTION

[75] Inventors: Tsukasa Yamashita, Nara; Masaharu Matano, Kyoto; Kazuhiko Mori, Osaka; Norihiro Ota, Kamifukuoka, all of Japan

[73] Assignee: Omron Tateisi Electronics Co., Kyoto, Japan

[21] Appl. No.: 716,605

[22] Filed: Mar. 27, 1985

Related U.S. Application Data

[63] Continuation of Ser. No. 349,685, Feb. 17, 1982, abandoned.

[30] Foreign Application Priority Data

Feb. 18, 1981 [JP] Japan .................................. 56-22664
Mar. 24, 1981 [JP] Japan .................................. 56-42870

[51] Int. Cl.$^4$ .............................................. G02B 6/10
[52] U.S. Cl. .................................. 350/96.13; 350/358; 350/96.14
[58] Field of Search ................... 350/96.13, 96.14, 358

[56] References Cited

U.S. PATENT DOCUMENTS

| | | | |
|---|---|---|---|
| 3,655,261 | 4/1972 | Chang | 350/96 WG |
| 3,810,688 | 5/1974 | Ballman et al. | 350/96.13 |
| 3,874,782 | 4/1975 | Schmidt | 350/96.13 |
| 3,904,270 | 9/1975 | Cheo | 350/96 WG |
| 3,923,376 | 12/1975 | Martin | 350/96 WG |
| 4,000,937 | 1/1977 | Kaminow | 350/96.14 |
| 4,047,795 | 9/1977 | Hughes et al. | 350/96.13 |
| 4,092,060 | 5/1978 | Nunoshita et al. | 350/96.13 |
| 4,208,091 | 6/1980 | Cheo et al. | 350/96.13 |
| 4,217,036 | 8/1980 | Chang | 350/96.13 |
| 4,253,060 | 2/1981 | Chen | 350/96.14 |
| 4,264,125 | 4/1981 | Shibata | 350/96.14 |
| 4,280,755 | 7/1981 | McNaney | 350/358 |
| 4,297,704 | 10/1981 | Marom et al. | 350/96.13 |
| 4,415,226 | 11/1983 | Verber et al. | 350/96.13 |
| 4,439,016 | 3/1984 | Ogland et al. | 350/96.14 |

FOREIGN PATENT DOCUMENTS 821661 10/1959 United Kingdom ............ 350/96.13

OTHER PUBLICATIONS

"Fast Acousto-Optical Waveguide Modulators", Manhar L. Shah, *Appl. Phys. Lett.*, vol. 23, No. 2, Jul. 1973.
"Programmable Optical Guided-Wave Device Using $Bi_{12}SiO_{20}$ Crystal", Hideki Hayashi, *IEEE Journal of Quantum Electronics*, vol. QE-14, No. 11, Nov. 1978, pp. 848-854.
"Temperature Stabilized Optical Waveguide Modulation", Makoto Minakata et al, *Review of the Electrical Communication Laboratories*, vol. 26, Nos. 9-10, Sep.-Oct. 1978, pp. 1139-1151.
"Electro-Optic Multiplexer for Large-Numerical Aperture, Low-Loss Fibers", Gravel et al, *Optics Letters*, vol. 1, No. 1.
"High-Performance Acousto-Optic Guided-Light Beam Device Using Two Tilting Surface Acoustic Waves", *Applied Physics Letters*, vol. 26, No. 4, pp. 140-142, Feb. 15, 1975, Tasi et al.
"Thermo-Optic Effect in $LiNbO_3$ for Light Deflection and Switching", by Haruna et al, *Electronics Letters*, vol. 17, No. 22, Oct. 29, 1981.
"A Frequency-Multiplexing Light Source with Monolithically Integrated Distributed-Feedback Diode Lasers", by K. Aiki et al.

*Primary Examiner*—William L. Sikes
*Assistant Examiner*—Robert E. Wise
*Attorney, Agent, or Firm*—Cushman, Darby & Cushman

[57] ABSTRACT

A plurality of incident light beams are parallelly propagated in a thin film optical waveguide. Simultaneously, a surface acoustic wave is propagated in said thin film optical waveguide, and the plurality of incident light beams are selectively successively guided to a light output part by the acousto-optic effect of said by Bragg diffraction. The diffraction light beams are serially output. In this way optical data parallelly input are directly converted into optical data in a serial state.

15 Claims, 10 Drawing Figures

FIG. 9 ically perform parallel-serial conversion causes complicated circuit construction.
PARALLEL-TO-SERIAL CONVERSION OF OPTICAL DATA USING ACOUSTO-OPTICAL DIFFRACTION This is a continuation of application Ser. No. 349,685, filed Feb. 17, 1982, which was abandoned upon the filing hereof.

BACKGROUND OF THE INVENTION

This invention relates to a converter for converting optical data input in parallel directly to that in serial.

The conversion of the optical data in parallel into the optical data in serial, similarly to the conversion of an electric signal from parallel to serial, has been considered as important signal processing technology.

Usually in a general converter for performing the parallel-serial conversion of optical data, a conversion method has been used such that parallel optical data is once converted into a parallel electrical signal then converted into a serial electrical signal and further converted into the optical data, finally resulting in serial optical data obtained from the parallel optical data. However, a conventional converter of this kind has a number of problems.

(a) Two conversions, such as light→electricity and electricity→light must be performed, for which the delay time required for the conversion is accumulated to increase the time of parallel-serial conversion.

(b) Low efficiency of mutual conversion between light and electric signals causes a remarkable decrease of output light intensity, resulting in the necessity for amplifying the light.

(c) The necessity for providing a circuit to electrically perform parallel-serial conversion causes complicated circuit construction.

(d) In case of integration for the converter, the hybrid forming of the whole substrate requires a very high level of manufacturing technology.

BRIEF SUMMARY OF THE INVENTION

It is a fundamental object of this invention to provide a parallel-serial converter of optical data with simplified construction for converting parallel input optical data directly into serial optical data without converting the parallel input optical data into an electric signal at any point.

Another object of this invention is to present an optical data parallel-serial converter with a thin filmed solid-state component constituted by forming a thin film optical waveguide on its substrate surface and then applying the acousto-optical effect of said thin film optical waveguide guiding by turns a plurality of incident light beams to a light output part which can be easily prepared by the technology of optical IC further with realized operation at high speed.

Further object of this invention is to present various methods of operation for guiding by turns a plurality of light beams to the output part of light by the acousto-optical effect of the above described thin film optical waveguide.

Other and further objects of this invention will become obvious upon an understanding of the illustrative embodiments about to be described or will be indicated in the appended claims, and various advantages not referred to herein will occur to one skilled in the art upon employment of the invention in practice.

DETAILED DESCRIPTION OF THE INVENTION

Figure 1:
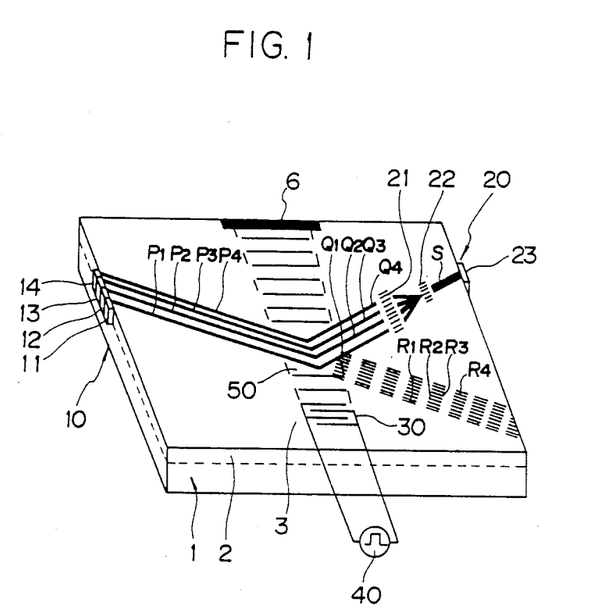
FIG. 1 is a top view of first presently preferred exemplary embodiment of a converter in accordance with the present invention showing the overall construction.

The description will be made firstly for the first embodiment of an optical data parallel-serial converter relating to this invention as shown in FIG. 1.

This converter is provided with a thin film optical waveguide 2 formed on the surface of a substrate 1, surface acoustic wave generating part 3 for propagating a surface acoustic wave on said thin film optical waveguide 2, light input part 10 for propagating parallelly with a prescribed interval a plurality of input light beams P1–P4 in such a manner as to obtain a Bragg angle with respect to the level of the above described acoustic surface wave in the above described thin film optical waveguide 2, light output part 20 collecting and reflecting diffracted lights Q1–Q4 Bragg diffracted by the above described acoustic surface wave, and driver circuit 40 propagating an acoustic surface wave pulse 50 of prescribed pulse width mutually relating to the interval of the above described plurality of incident light beams P1–P4 from the above described acoustic surface wave generating part 3, and constituted in such a manner that the above described plurality of incident light beams P1–P4 are in turns Bragg diffracted by the propagation of the above described acoustic surface wave pulse 50 and output from the above described light output part 20 as the output light S in a serial state.

The above described substrate 1 consists of lithium niobate monocrystal of piezoelectric crystal, and titanium is thermally diffused on the surface of said crystal to form the thin film optical waveguide 2 with a refractive index about 0.003–0.005 higher than the substrate 1.

The above described surface acoustic wave generating part 3 consists of an interdigital transducer 30 formed in a prescribed position on the thin film optical waveguide 2. A driver circuit 40 for driving said interdigital transducer 30 is constituted by a high frequency oscillator or timing control circuit and the like.

As described later, the interdigital transducer 30 is intermittently pulse driven, generating a surface acoustic wave pulse 50 which is propagated in the central portion on the thin film optical waveguide 2. An acoustic absorbing member 6 is formed at an end part of the thin film optical waveguide 2 at the propagation directional final end side of said surface acoustic wave beam for preventing the reflection of the surface acoustic wave.

The above described light incident part 10 comprises four fiber connectors 11-14 formed in the left side of the thin film optical waveguide 2, and an optical fiber guiding incident light is connected to each of the fiber connectors 11-14. Four incident light beams P1-P4 are propagated through these fiber connectors 11-14 into the thin film optical waveguide 2. Each of the incident light beams P1-P4 is placed in parallel a prescribed interval apart and further arranged so as to cross at the Bragg angle for the level of a surface acoustic wave generated from the interdigital transducer 30. Each of the incident light beams P1-P4, when Bragg diffracted by the surface acoustic wave, becomes diffracted light beams Q1-Q4 respectively those beams Q1-Q4 not diffracted become straight light beams R1-R4 respectively.

The above described light output part 20 comprises grating lenses 21, 22 formed in a prescribed position on the thin film optical waveguide 2 propagating the diffraction light beams Q1-Q4 and a fiber connector 23 formed in the right side of the thin film optical waveguide 2 to collect the light beams Q1-Q4 diffracted by the grating lenses 21, 22 and guide the collected output light S to an optical fiber coupled to the fiber connector 23.

Figure 2A:
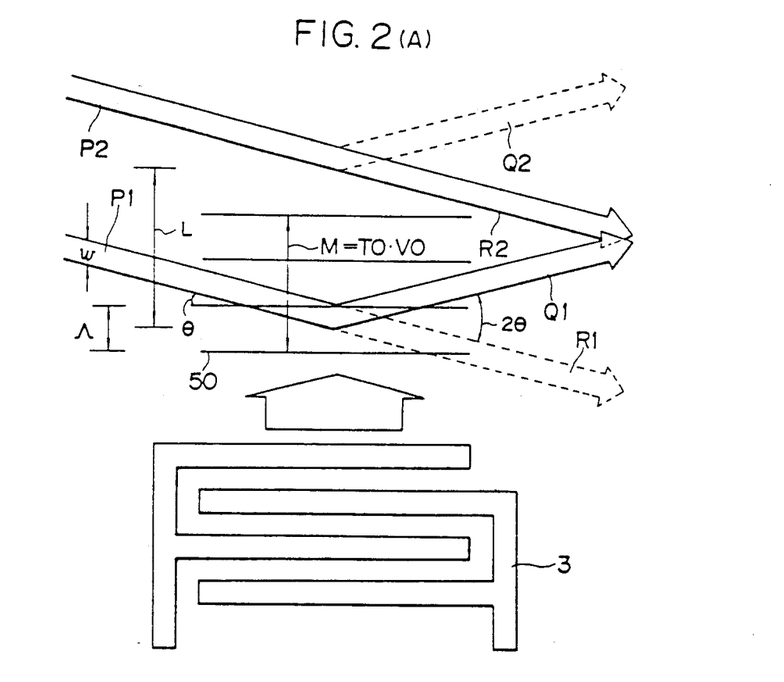
FIGS. 2(a) and 2(b) are an enlarged graphical illustration and detailed timing chart for explaining operations of the first embodiment.

The action of a converter constituted as described in the above will be described in detail in accordance with an enlarged explanation diagram in FIG. 2. In the FIG. 2, two incident light beams P1 and P2 are abstracted and shown. There beam width of the incident light beams P1, P2 is $\omega$. The interval of the incident light beams P1 and P2 is L in a propagation direction of the surface acoustic wave 50 from the interdigital transducer 30. The wavelength of light of the incident light beams P1, P2 is $\lambda$. The wavelength of the surface acoustic wave 50 is $\lambda$. An incident angle of the incident light beams P1, P2 for the level of the surface acoustic wave 50 is Bragg angle $\theta$, and this angle $\theta$ satisfies the following equation. The same as said in the above can be also said for incident light beams P3, P4.

In case of satisfying the above equation as known publicly, a periodic change of refractive index due to the surface acoustic wave 50 propagating in the thin film optical waveguide 2 acts as the diffraction grating, and light incident upon a level of this wave at an angle $\theta$ is completely reflected by said wave level and changed its progressive direction by $2\theta$ to become a diffracted light beam Q1 or Q2. When not being diffracted by said surface acoustic wave 50, light beams P1, P2 advance straight as shown by R1 or R2.

Figure 2B:
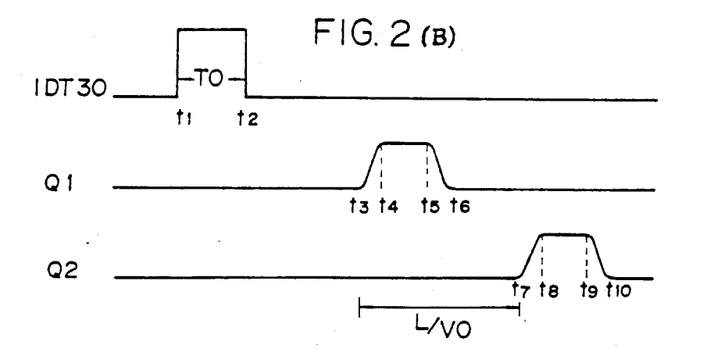

A driving signal applied from the driver circuit 40 to the interdigital transducer 30 is high frequency voltage in a pulse state with width T0 as shown in FIG. 2 (B). Accordingly, a surface acoustic wave 50 of duration time limited pulse shape is generated by interdigital transducer 30. In this way, the surface acoustic wave, in which the duration time of generation is limited by the pulse driving, is called a surface acoustic wave pulse.

The letter M in FIG. 2 (A) shows the pulse width of the above described surface acoustic wave pulse 50. Where T0 stands for for pulse width of the driving signal and V0 stands for propagation speed of the surface acoustic wave, pulse width M of the surface acoustic wave pulse 50 is $M = T0 \times V0$. Then the condition $M \leq L$ is set for the above described surface acoustic wave pulse 50, when propagated, not to simultaneously cross at least two of the incident light beams P1-P4 thus, $T0 \leq L/V0$. In short, the surface acoustic wave pulse 50 crosses successively only with one of the parallel four incident light beams P1-P4. Accordingly, as shown in the FIG. 2 (B), when a driving signal is transmitted during the time t1-t2, so generated surface acoustic wave pulse 50 of width M firstly begins crossing with the foremost incident light beam P1, and this causes the incident light beam P1 to begin Bragg diffraction. Intensity of the diffracted light Q1 of the incident light beam P1 gradually increases from the time t3 when the diffraction is started, to become maximum at the time t4 when the incident light beam P1 completely enters the region of the surface acoustic wave pulse 50, then begins decreasing from the time t5 when a tail end of the surface acoustic wave pulse 50 begins derailing from the incident light beam P1, finally becomes zero at the time t6 at the complete derailing. Hereafter, the surface acoustic wave pulse 50 is further in progress, then its front end begins to cross with the second incident light beam P2 at the time t7 delayed by the time L/V0 from the time t3 where the Bragg diffraction starts occurring. In this way, intensity of the diffracted light Q2 of the incident light beam P2 is changed in such a pulse state as at the times t7→t8→t9→t10 to again become zero.

Figure 3:
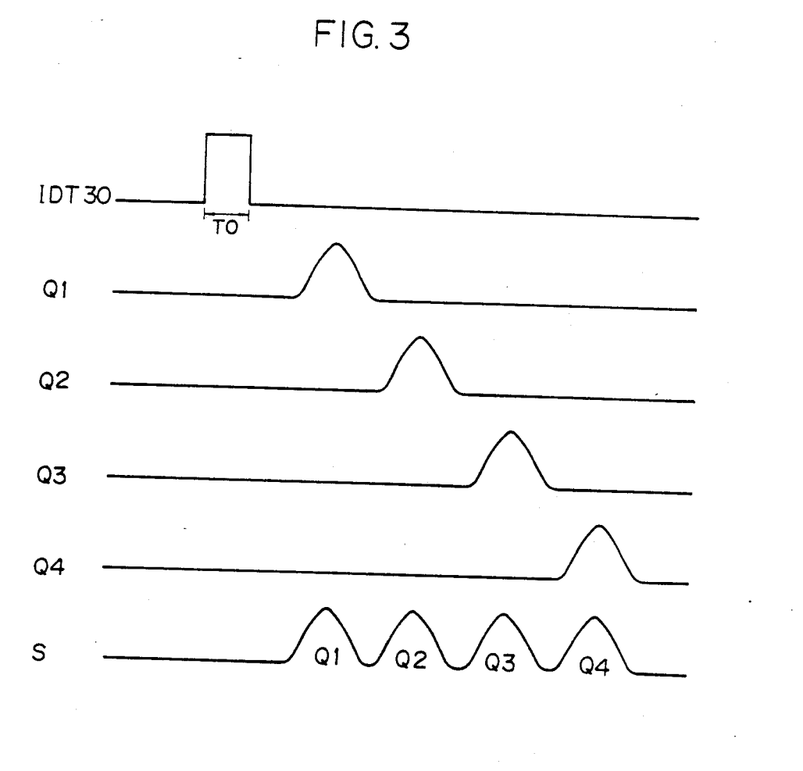
FIG. 3 a timing chart showing the operation of parallel-serial conversion by the first embodiment.

As described in the above, the incident light beams P1-P4 successively undergo Bragg diffraction by the propagation of the surface acoustic wave pulse 50 generated from the interdigital transducer 30. Then the Bragg diffracted light is collected (collimated) by the grating lenses 21, 22 to become the output light S. Accordingly as shown in FIG. 3, the diffracted light beams Q1-Q4 of the incident light beams P1-P4 can be guided successively to the light output part 20 not to cause a timely overlap finally output in a serial state as the output light S by the propagation of the surface acoustic wave 50 of one pulse generated with the driving signal of one pulse on the thin film optical waveguide 2.

Subsequently, the second embodiment of this invention will be described in conjunction with FIG. 4. The description below has been avoided from duplication about the basic constitution and its action with the contents in common to the before described first reference embodiment and performed on the point of different parts in the second embodiment from those in the first embodiment.

Figure 4:
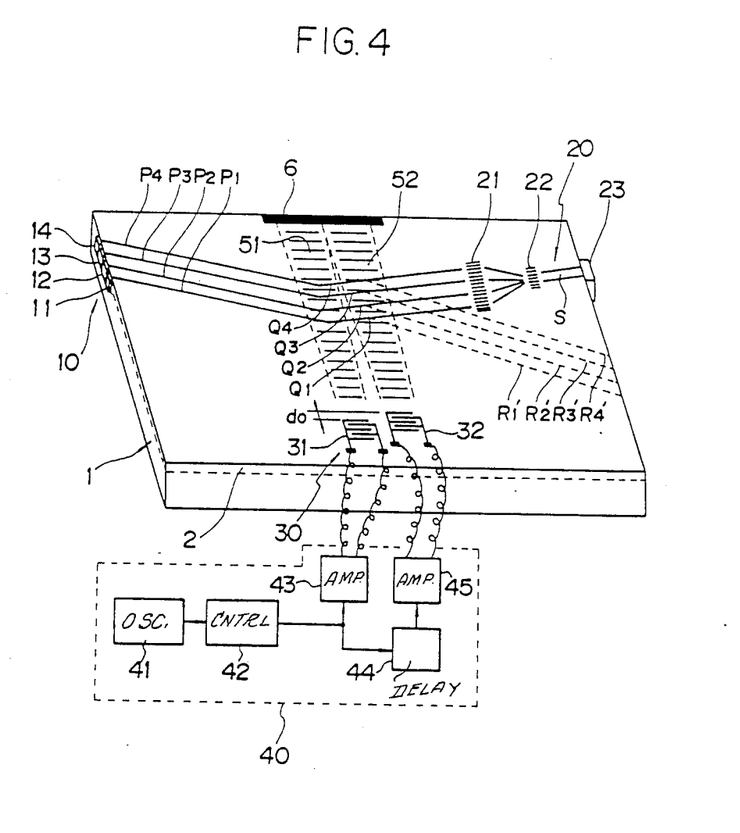
FIG. 4 a top perspective view showing the overall construction of a second presently preferred exemplary embodiment of a converter in accordance with the present invention.
Figure 5:
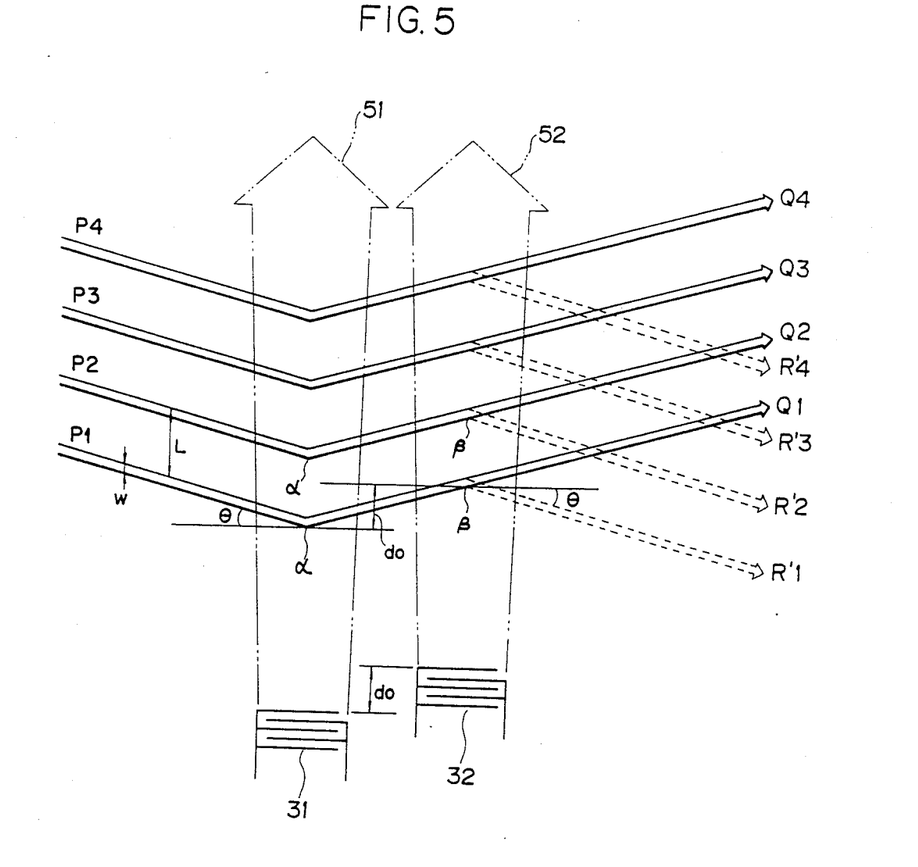
FIG. 5 an enlarged graphical illustration for the explanation of operations in the second embodiment.

In a converter as shown in FIG. 4, a surface acoustic wave generating part 3, to parallelly propagate the first surface acoustic wave 51 and the second surface acoustic wave 52 in a thin film optical waveguide 2, is provided with the first interdigital transducer 31 and the second interdigital transducer 32 formed in a prescribed position on the surface of said waveguide 2. When the first surface acoustic wave 51 from the first interdigital transducer 31 at the nearer side to a light incidence part 10 is only propagated on the waveguide 2, each of the incident light beams P1-P4 is Bragg diffracted by the first surface acoustic wave 51 and its diffracted light beam Q1-Q4 is guided to a light output part 20. When the first surface acoustic wave 51 from the first interdigital transducer 31 and the second surface acoustic wave 52 from the second interdigital transducer 32 are both propagating on the waveguide 2, each of the incident light beams P1-P4 Bragg diffracted by the first surface acoustic wave 51 obtains the Bragg angle θ of incidence also for the wave face of the second surface acoustic wave 52, and again this causes the diffraction. As a result, double diffracted light beams R'1-R'4 Bragg diffracted by the both of the first surface acoustic wave 51 and the second surface acoustic wave 52, as shown in the FIG., progress in a direction that the incident light beams P1-P4 are slightly shifted in parallel, and are not fed to the light output part 20 in the same way as for straight progressive light beams R1-R4 in the first reference example in the FIG. 1. FIG. 5 shows the diffraction of the incident light beams P1-P4 by the first surface acoustic wave 51 and second surface acoustic wave 52 with enlargement of its state. As shown in the FIG. 5, the second interdigital transducer 32 is formed in a propagating direction of surface acoustic wave by the distance (do) forward from the interdigital transducer 31. Said distance (do) is a distance in a propagating direction of surface acoustic waves between a diffraction point α of the light beam P1 by the first surface acoustic wave 51 and a diffraction point β of that by the second surface acoustic wave 52. Accordingly, when the surface acoustic waves 51, 52 are simultaneously emitted from the both of the interdigital transducers 31, 32, the time for a front end of the surface acoustic wave 51 to reach the diffraction point α and the time for a front end of the surface acoustic wave 52 to reach the diffraction point β are aligned.

Figure 6:
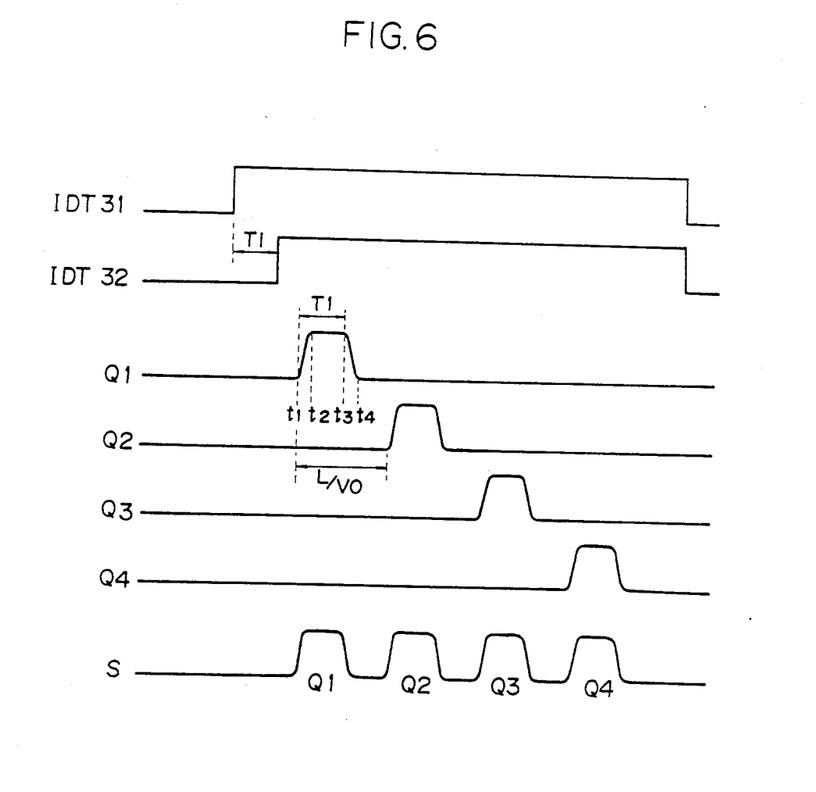
FIG. 6 a timing chart showing the operation of parallel-serial conversion by the second embodiment.

A driver circuit 40 shown in FIG. 4 comprises a high frequency oscillator 41, control circuit 42 for controlling the timing of parallel-serial conversion, amplifier 43 for amplifying the output of said control circuit 42 and applying it to the first interdigital transducer 31, delay circuit 44 for delaying the rise-up of the output from the control circuit 42 by a certain time T1, and an amplifier 45 for amplifying the output of said delay circuit 44 and applying it to the second interdigital transducer 32. In this constitution, the driving is started in the second interdigital transducer 32 at the time delayed by the above described certain time T1 after the driving is started in the first interdigital transducer 31. The state of this driving start timing is shown in FIG. 6.

As described in the above, the presence of time difference T1 between the driving start timings in the both interdigital transducers 31, 32 causes the propagation of the second surface acoustic wave 52 to delay behind the first surface acoustic wave 51. In the state of this delay on the thin film optical waveguide 2, the front end of the second surface acoustic wave 52 is delayed in a propagation direction of surface acoustic wave for the front end of the first surface acoustic wave 51 by the distance N as shown in the following expression.

$$N = V0 \cdot T1 - do$$

The delay distance N of the above described second surface acoustic wave 52 is set to such an amount as smaller than the distance (L−do) further fully enough larger than the beam width ω. Moreover, L is a beam interval of each incident light beam P1-P4 and V0 is the propagation speed of the surface acoustic wave.

In the setting performed as described in the above, the second surface acoustic wave 52 reaches its diffraction point β with the diffracted light beam Q1 of the first incident light beam P2 at the time slightly before the time when the first surface acoustic wave 51 reaches its diffraction point α with the second incident light beam P2, and thus the above relation is obtained.

In short, as shown by the timing chart in FIG. 6, at the point t1 when the front end of the first surface acoustic wave 51 reaches the diffraction point α of the foremost incident light beam P1, the diffraction of the incident light beam P1 is started, then intensity of the diffracted light beam Q1 guided to the light output part 20 becomes maximum at the time t2. Thereafter, at the time t3 when the front end of the second surface acoustic wave 52 reaches the diffraction point β of the foremost light beam Q1, the light beam Q1 is started to be diffracted by the surface acoustic wave 52, then intensity of the light beam Q1 guided to the light output part 20 becomes zero at the time t4 and all become double diffracted light beam R'1.

Hereafter in the same way, in accordance with the progress of both surface acoustic waves 51, 52, the incident light beam P2 is diffracted by the surface acoustic wave 51 and its diffracted light beam Q2 is guided to the light output part 20 only for a period not diffracted in the surface acoustic wave 52. Subsequently, the incident light beam P3 is diffracted by the surface acoustic wave 51 and its diffracted light beam Q3 is guided to the light output part 20 only for a period not diffracted in the surface acoustic wave 52. Subsequently, the incident light beam P4 is diffracted by the surface acoustic wave 51 and its diffracted light beam Q4 is guided to the light output part 20 only for a period not diffracted in the surface acoustic wave 52. In this way, the diffracted light beams Q1-Q4 of the incident light beam P1-P4 applied in a parallel state are guided successively to the light output part 20 in such a manner as not to provide timely overlap and output in a serial state as the output light S.

Figure 7:
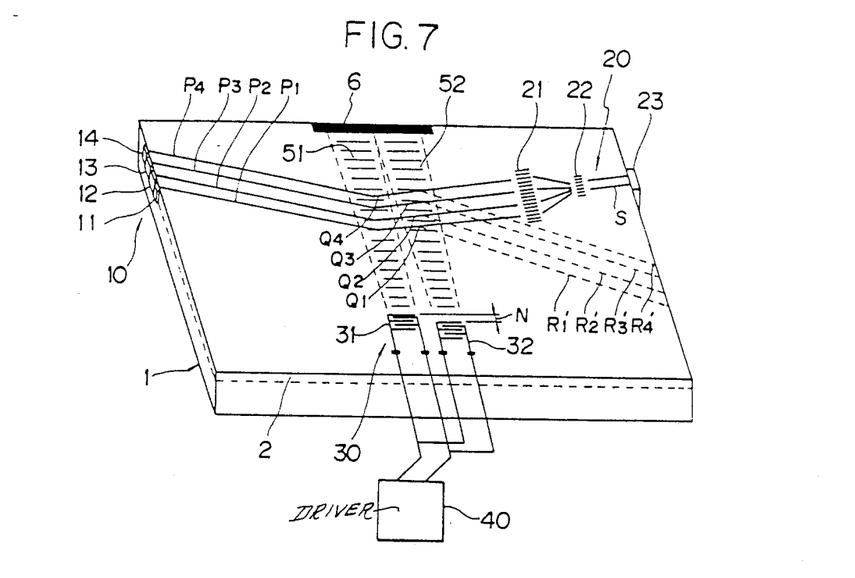
FIG. 7 a top perspective view showing the overall construction of a third presently preferred exemplary embodiment of a converter in accordance with the present invention.

Subsequently, the third embodiment of this invention will be described in conjunction with FIG. 7. The third embodiment has many of similarities to the second embodiment in FIG. 4. The above described second embodiment contains such a different feature that to cause a propagation delay distance N between the front end of the first surface acoustic wave 51 and the front end of the second surface acoustic wave 52, the driving start timings of the first interdigital transducer 31 and the second interdigital transducer 32 were allowed to differ by the time T1. In the third embodiment for the above, as shown in FIG. 7, the first interdigital transducer 31 is formed so as to be located in a progressive direction of surface acoustic wave forward by the distance N from the second interdigital transducer 32. If the driving is started simultaneously in the both interdigital transducers 31, 32 by the driver circuit 40, the first surface acoustic wave 51 and the second surface acoustic wave 52 delayed by the distance N from the former are propagated on the thin film optical waveguide 2. The operation, in which conversion of light beams P1-P4 into a serial state is performed by the surface acoustic waves 51, 52 provided with said delays, is quite the same as that in the before described second example.

The fourth embodiment of this invention will be described on the basis of FIG. 8.

Figure 8:
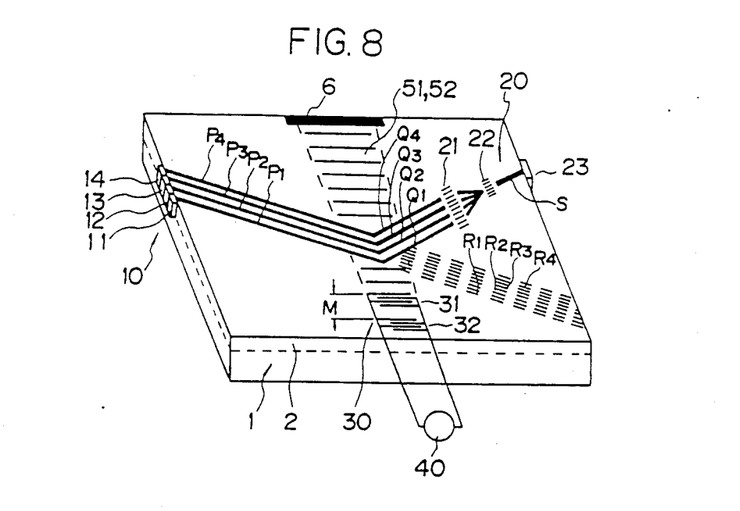
FIG. 8 a top perspective view showing the overall construction of a fourth presently preferred exemplary embodiment of a converter in accordance with the present invention.

In a converter shown in the FIG. 8, a surface acoustic wave generating part 30 comprises the first interdigital transducer 31 and the second interdigital transducer 32 formed rearward on extension of a propagation passage of the first surface acoustic wave 51 generated from said interdigital transducer 31. The second surface acoustic wave 52 generated from the second interdigital transducer 32 is propagated in a propagation passage of the first surface acoustic wave 51 in a same direction. When the interdigital transducers 31, 32 are both driven, the first and second surface acoustic waves 51, 52 are completely overlapped. Each of the incident light beams P1-P4 is Bragg diffracted by the first surface acoustic wave 51 and its diffracted light beam Q1-Q4 is guided to the light output part 20. However, the overlapping of the second surface acoustic wave 52 with the first surface acoustic wave 51 causes the action of Bragg diffraction of the first surface acoustic wave 51 to disappear due to a reason described later, and the action of Bragg diffraction is not shown in the resultant wave component of the both surface acoustic waves 51, 52. In this case, each of the incident light beams P1-P4 becomes a straight progressive light beam R1-R4 similarly to that when no surface acoustic wave is produced.

Figure 9:
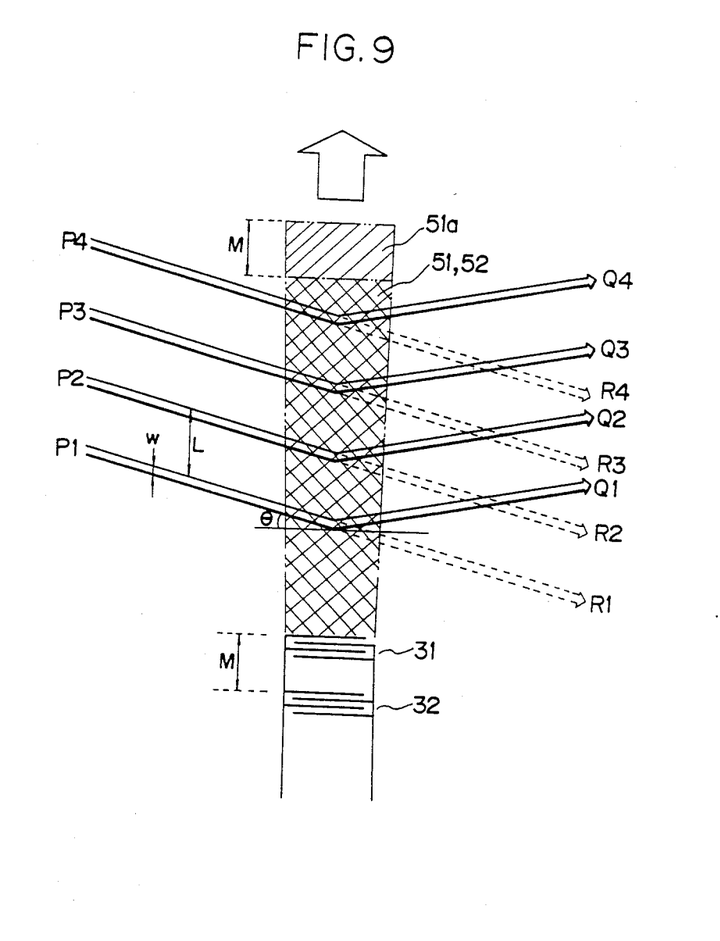
FIG. 9 an enlarged graphical illustration diagram for the explanation of operations in the fourth embodiment.

The above described first interdigital transducer 31 and second interdigital transducer 32 are arranged in a propagation direction of surface acoustic wave spaced apart by the distance M. Both interdigital transducers 31, 32 are simultaneously driven by the driver circuit 40. Accordingly, as shown in FIG. 9, the surface acoustic wave 52 from the interdigital transducer 32 is propagated with a delay by the distance M behind the surface acoustic wave 51 from the interdigital transducer 31, and at the forward side in a propagation direction from the interdigital transducer 31 in a rear portion 51a by the distance M from the front end of the surface acoustic wave 51 though the surface acoustic wave 51 is singly existent, in a further rear portion the surface acoustic wave 51 and the surface acoustic wave 52 become overlapped. Said distance M has been determined in a same manner as that for a pulse width M of the surface acoustic wave pulse 50 in the first embodiment as shown in the FIGS. 1-3. Then the portion 51a, where the surface acoustic wave 51 is singly existent, rearward by the distance M from the front end of the surface acoustic wave 51 similarly acts to that in the surface acoustic wave pulse 50 in the before described first example, thus with the progress of said portion 51a each of the incident light beams P1-P4 is in turn Bragg diffracted and guided to the light output part 20 finally output in a serial state as the output light S.

An explanation why a combined wave of the first surface coustic wave 51 and the second surface acoustic wave 52 in the above described fourth embodiment results in no action of the Bragg diffraction will now be given. In the phenomenon of Bragg diffraction for a light beam by a surface acoustic wave in the thin film optical waveguide 2, the efficiency I of the Bragg diffraction, that is, the ratio of intensities of an incident light beam P and diffracted light beam Q is given by the following expression.

$$I = \sin^2(a\pi l)$$

Where l is a mutually acting length of surface acoustic wave and incident light beam P, the value determined by width of the surface acoustic wave, in short, the width of interdigital transducer generating the surface acoustic wave. $\Delta n$ is a peak value for a change of refractive index in the thin film optical waveguide 2 by the surface acoustic wave, that is, the value relying on power of the surface acoustic wave. In the fourth embodiment shown in FIG. 8 and FIG. 9, when the first surface acoustic wave 51 is singly propagated, $\Delta n = \pi/(2l)$ is obtained with $I = 1$, thus the incident light beam P is adjusted and set so as to be diffracted 100%. While in case of compounding the first and second surface acoustic waves 51, 52, the peak value $\Delta n$ of a change of refractive index is adjusted and set in such a manner as to be two times that in case of the single surface acoustic wave and to obtain the relation $\Delta n = \pi/l$. Then in the state of a compound wave from the surface acoustic waves 51, 52, $I = 0$ is obtained not to show the action of Bragg diffraction, thus the incident light beam P progresses straight.

As many apparently widely different embodiments of this invention may be made without departing from the spirit and scope thereof, it is to be understood that the invention is not limited to the specific embodiments thereof except as defined in the appended claims.

What we claim is:

1. A parallel-serial converter for optical data conversion, which comprises:
    a thin film optical waveguide formed on the surface of a substrate;
    surface acoustic wave generating means for propagating a surface acoustic wave on said thin film optical waveguide;
    light incident means for propagating a plurality of incident light beams in the above described thin film optical waveguide parallelly with a prescribed interval placed so as to obtain the Bragg angle with the wave face of the above described surface acoustic wave;
    driving means for driving said surface acoustic wave generating means to generate said surface acoustic wave; and
    light output means for receiving and outputting diffraction light Bragg diffracted by the above described surface acoustic wave,
    wherein with the progress of the above described surface acoustic wave the above described plurality of incident light beams are successively guided to the above described light output means and output in a serial state.

2. The optical data parallel-serial converter as described in claim 1, wherein said surface acoustic wave generating comprises an interdigital transducer formed on the above described thin film optical waveguide, the above described driving means pulses drives the above described interdigital transducer allowing said interdigital transducer to propagate a surface acoustic wave pulse of prescribed pulse width corresponding to the interval of the above described plurality of incident light beams, and in which, the above described plurality of incident light beams are successively Bragg diffracted by the propagation of said surface acoustic wave pulse and output from the above described light output means in a serial state.

3. The optical data parallel-serial converter described in claim 1, in which to parallelly propagate the first and the second surface acoustic wave in the above described thin film optical waveguide the above described surface acoustic wave generating means comprises first and second interdigital transducers formed on the surface of said waveguide, the above described driving means propagates a first surface acoustic wave from the first interdigital transducer at the nearer side to the above described light incident means to successively perform the Bragg diffraction of the above described plurality of incident light beams simultaneously generates a second surface acoustic wave from the above described second interdigital transducer in such a manner as to be delayed by the distance relating to the interval of each incident light beam from the above described first surface acoustic wave, allowing said second surface acoustic wave to perform the Bragg diffraction successively of a light beam Bragg diffracted by the above described first surface acoustic wave, resulting in the operation that incident light beams Bragg diffracted further not diffracted by the above described second surface acoustic wave are successively guided to the above described light output means.

4. The optical data parallel-serial converter described in claim 3, in which the above described surface acoustic wave is propagated with the delay by a certain distance from the above described first surface acoustic wave by driving the above described second interdigital transducer with the delay by a certain time from the above described first interdigital transducer.

5. The optical data parallel-serial converter described in claim 3, in which the above described first and second surface acoustic wave simultaneously driven and generated are propagated with the delay of the second surface acoustic wave by a certain distance from the first surface acoustic wave by forming the above described first interdigital transducer and the second interdigital transducer in a propagation direction of the surface acoustic wave with the interval of a certain distance.

6. The optical data parallel-serial converter described in claim 1, in which to propagate the first and the second surface acoustic wave in the above described thin film optical waveguide in such a manner as to be overlapped in the same direction, the above described surface acoustic wave generating means comprises the first and the second interdigital transducer formed on the surface of said waveguide, the above described driving means propagates the first surface acoustic wave from the first interdigital transducer to successively perform the Bragg diffraction of the above described plurality of incident light beams and simultaneously generates the second surface acoustic wave from the above described second interdigital transducer so as to be delayed from the above described first surface acoustic wave by the distance mutually relating to the interval of each incident light beam, allowing the action of its Bragg diffraction to disappear by overlapping with the above described first surface acoustic wave, resulting in the action that the above described plurality of incident light beams are successively Bragg diffracted by the above described first surface acoustic wave not overlapped with the above described second surface acoustic wave and guided to the above described light output part.

7. An apparatus for converting parallel optical data to serial optical data, comprising:
receiving means for receiving a plurality of parallel beams of light;
means for propagating each of said plurality of beams in a first direction, said propagated beams being mutually parallel;
means for successively diffracting, one at a time, said plurality of beams in order to redirect said one in a second direction; and
collimating means for directing each of said diffracted beams along a common serial output path.

8. An apparatus as in claim 7 wherein:
said propagating means includes a thin film optical waveguide; and
said diffracting means includes:
electrical signal source means for producing an electrical pulse of a predetermined duration; and
first transducer means, disposed on said waveguide and responsive to said electrical pulse, for propagating a surface acoustic wave pulse on said waveguide, the wavefront of said wavepulse successively crossing, at the Bragg angle, each of said plurality of propagating parallel beams one at a time, to diffract said plurality of beams in sequence.

9. An apparatus as in claim 8 wherein:
adjacent ones of said plurality of parallel propagating beams are separated by a distance L; and
said predetermined duration of said electrical pulse is less than L divided by the velocity at which said wave pulse propagates on said wave guide.

10. An apparatus as in claim 8 further including:
electrical delay means, responsive to said electrical pulse, for delaying said electrical pulse by a predetermined time interval; and
second transducers means, disposed on said waveguide and responsive to said delayed electrical pulse, for propagating a delayed surface acoustic wave pulse on said wave guide, the wave front of said delayed wave pulse successively crossing, at the Bragg angle, said beam diffracted by the wave pulse produced by said first transducer means to diffract said already diffracted beam in order to redirect said diffracted beam away from said common path a predetermined time after said first transducer means has directed said diffracted beam onto said path.

11. A method for converting parallel optical data to serial optical data, comprising the steps of:
receiving a plurality of parallel beams of light;
propagating each of said plurality of beams in a first direction, said propagated beams being mutually parallel;
successively diffracting, one at a time, said plurality of beams in order to redirect said one in a second direction; and
directing each of said diffracted beams along a common serial output path.

12. A method as in claim 11 wherein:
said propagating step comprises propagating said plurality of beams through a thin film optical waveguide; and
said diffracting step includes the steps of:
producing an electrical pulse of a predetermined duration; and
propagating a surface acoustic wave pulse on said waveguide, the wave front of said wave pulse successively crossing, at the Bragg angle, each of said plurality of propagating parallel beams, one at a time, to diffract said plurality of beams in sequence.

13. A method as in claim 12 wherein said electrical pulse producing step comprisese the step of producing an electrical pulse the duration of which is less than the separation distance of adjacent ones of said plurality of parallel propagating beams divided by the velocity at which said wave pulse propagates on said waveguide.

14. A method as in claim 12 further including the step of:

propagating a second surface acoustic wave pulse on said wave guide, said second wave pulse delayed by a predetermined time interval with respect to said first wave pulse, the wave front of said second wave pulse successively crossing, at the Bragg angle, said beam diffracted by said first wave pulse in order to diffract said already diffracted beam to redirect it away from said common path a predetermined time after said first wave pulse directed it onto said path.

15. A method as in claim 14 wherein said second wave pulse producing step includes the step of delaying said electrical pulse by a predetermined time interval.

* * * * *